United States Patent [19]

Jerson et al.

[11] Patent Number: 4,554,470
[45] Date of Patent: Nov. 19, 1985

[54] POLYBUTADIENE VPI RESIN

[75] Inventors: Donald D. Jerson, Norvelt; James F. Chance, Turtle Creek, both of Pa.

[73] Assignee: Westinghouse Electric Corp., Pittsburgh, Pa.

[21] Appl. No.: 618,841

[22] Filed: Jun. 8, 1984

[51] Int. Cl.$^4$ ............................................. H02K 15/12
[52] U.S. Cl. ...................................... 310/45; 427/295; 428/375; 428/378; 428/379; 428/383; 524/449; 525/263; 525/281; 525/290
[58] Field of Search ............... 428/462, 375, 378, 379, 428/383; 310/43, 45; 525/263, 281, 290; 524/449

[56] References Cited

U.S. PATENT DOCUMENTS

| | | | |
|---|---|---|---|
| 3,636,141 | 1/1972 | O'Neill et al. | 525/193 |
| 3,986,253 | 10/1976 | Harris | 310/43 |
| 4,362,848 | 12/1982 | Friedi et al. | 525/193 |
| 4,453,988 | 6/1984 | Slater et al. | 428/462 |

*Primary Examiner*—Jacob Ziegler
*Attorney, Agent, or Firm*—R. D. Fuerle

[57] ABSTRACT

Disclosed is a coil of insulated wire impregnated with a solventless vacuum pressure impregnated resin. The resin contains polybutadiene, at least 15% of which is 1,2-polybutadiene, about 10 about 150 phr dicyclopentadiene acrylate, about 0.005 to about 0.75 phr of a free radial polymerization inhibitor, about 0.05 to about 2.5 phr of a free radial polymerization initiator, and up to about 2.0 phr of a coupling agent. An optional component is about 1 to about 80 phr of an aromatic monomer having 1 to 2 vinyl groups. Also disclosed is a method of making a vacuum pressure impregnated coil by placing a coil of insulated wire in a partial vacuum, impregnating the coil with the resin, applying pressure to the resin to force it into the interstices of the coil, and curing the resin by heating it at about 100° to about 180° C. for about 2 to about 16 hours.

13 Claims, 1 Drawing Figure

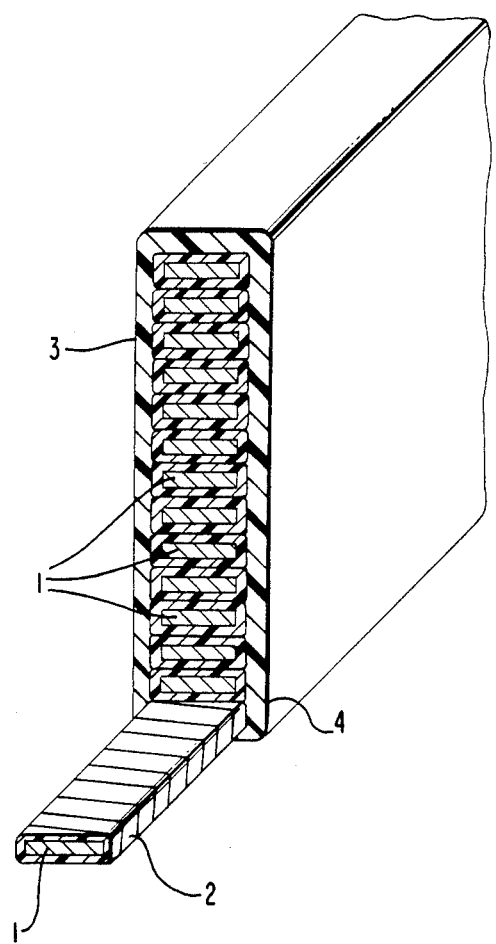

4,554,470

POLYBUTADIENE VPI RESIN

BACKGROUND OF THE INVENTION

When motor and generator coils are made, insulated wires are wound or laid to form coils which are impregnated with a resin in a process known as vacuum pressure impregnation (VPI). The VPI resin fills the interstices of the coil, supplementing the insulation on the wires, adding to the mechanical strength of the coil, and preventing the individual wires from rubbing against each other and abrading the insulation.

Until now, various polyester and epoxy resins were used for this purpose. While these VPI resins perform satisfactorily, several of their properties are not as good as is desired. For example, a higher thermal stability is desirable so that the resin does not break down electrically or mechanically at the high temperatures at which the motors and generators operate. It is also desirable to have better high temperature electrical properties such as dielectric constant and dissipation factor. Finally, faster gelling VPI resins are desirable so that the resin does not run out of the interstices of the coil before it gels.

SUMMARY OF THE INVENTION

We have discovered that an insulated coiled wire impregnated with a certain particular polybutadiene resin is superior to similar coils impregnated with presently used polyester or epoxy VPI resins. The insulated coils of this invention have a higher thermal stability and better high temperature electrical properties, such as dielectric constant and dissipation factor at 180° or 200° C. Also, we have found that the particular polybutadiene resin used in this invention has a fast gel time which prevents the resin from draining out of the voids in the coil before it solidifies.

RELEVANT ART

U.S. Pat. No. 4,362,848 discloses resins for use in making laminates which contain polybutadiene and dicyclopentadiene acrylate.

DESCRIPTION OF THE INVENTION

The accompanying drawing is an isometric view partially in section showing a coil impregnated with the polybutadiene resin of this invention.

In the drawing, conductors 1 are individually insulated with insulation 2, preferably a mica tape. The conductors are juxtaposed and collectively insulated with insulation 3 which is also preferably a mica tape. The VPI resin of this invention 4 fills all of the spaces in between the insulation, and is preferably also used as the binder for the mica tape.

The vacuum pressure impregnated resin used in this invention is a solventless composition containing polybutadiene, at least 15% (by weight) of which is 1,2-polybutadiene. The remaining portion of the polybutadiene may be 1,4-polybutadiene or cyclized polybutadiene, but if less than 15% of the polybutadiene is the 1,2-polybutadiene, the resin will be too elastomeric and there will be a loss of thermal stability and mechanical strength.

The composition also includes about 10 to about 150 phr (parts per hundred parts resin, where "resin" means total polybutadiene weight) of dicyclopentadiene acrylate. If less than about 10 phr of dicyclopentadiene acrylate is used, the viscosity of the resin will be too high and it will not readily flow into the interstices of the coil. Also, the gel time will be long and the cured resin will be too soft and have poorer mechanical properties. If more than about 150 phr of dicyclopentadiene acrylate is used, a loss of thermal properties may result. Other acrylates have been tried but it has been found that dicyclopentadiene acrylate is the only acrylate which gives the high thermal stability, good high temperature electrical properties, and some of the high temperature mechanical properties that are needed for a VPI resin.

About 0.005 to about 0.75 phr of an inhibitor which prevents the free radical polymerization of the resin at room temperature is also included in the composition. If less than about 0.005 phr of inhibitor is used, the resin may gel in the storage tank, and if more than about 0.75 phr is used, the gel time will lengthen. The inhibitor gives the composition shelf life and tank stability. Any free radical scavengers may be used as the inhibitor such as hydroquinone, anthraquinone, 2,6-di-t-butyl-paracresol, methyl ethyl hydroquinone, methyl ether of hydroquinone, and t-butylcatechol. The preferred inhibitor is t-butylhydroquinone as it has been found to work well.

About 0.05 to about 2.5 phr of a catalyst is also required. If less than about 0.05 phr of catalyst is used, the cure may not be complete and if more than 2.5 phr is used, the resin may gel in the storage tank. The catalyst is a free radial polymerization initiator, preferably a high temperature peroxide. Hydroperoxides seem to work well, but dicumyl peroxide is preferred as it gives high temperature properties, a long pot life, and a good cure. Other peroxides which may be used include ditertiary butyl peroxide, benzoyl peroxide, benzoyl acetyl peroxide, dinaphthoyl peroxide, and benzoyl lauryl peroxide.

Also included is up to about 2.0 phr of a coupling agent. The coupling agent increases the bonding between the cured resin and metal or insulation in the coil. Coupling agents are usually compounds which have both an organic reactive group and an inorganic reactor group such as various types of silanes. The preferred silane is vinyl-tris (betamethoxyethoxy) silane as it has been found to be compatible with the other components of the composition. More than 2.0 phr of the coupling agent is not necessarily harmful but may provide no additional benefit.

Finally, in those applications where a lower viscosity is needed, it is preferred to include about 1 to about 80 phr of an aromatic monomer having 1 to 2 vinyl groups. More than 80 phr increases the gel time and reduces properties, but less than about 1 phr has no discernable effect. If a lower viscosity is not needed, the aromatic monomer is preferably not included because it may lower the properties somewhat and increase the gel time. The vinyl compound has only a single aromatic ring and has 1 or 2 vinyl groups. Suitable vinyl monomers include vinyl toluene, divinyl benzene, tertiary butyl styrene, and styrene. The preferred vinyl monomer is vinyl toluene because it provides the best balance of properties for use in VPI systems.

The composition of this invention does not include a solvent because solvents would either leave voids behind in the resin as they vaporized, or lower the viscosity of the resin to a point where it runs off the coil before the resin could cure. Driers are also not included in the composition because they reduce tank stability.

Of course, ionic compounds are excluded as they would lower the dielectric constant of the resin. The composition is prepared by simply mixing together thoroughly the various components until a homogeneous blend is achieved.

The resin may be applied to insulated conductors of any material (typically copper or aluminum), and to insulation of any type. It is especially useful with mica insulation which has a polybutadiene binder because that binder is compatible or co-reactive with the resin and better electrical properties are obtained. The motor or generator coil to be vacuum pressure impregnated is placed in a vacuum tank to which a partial vacuum is applied to remove the air from the interstices of the coil. The resin composition is then permitted to flow into the tank until the coil is immersed. Pressure is then applied to the resin to force it into the interstices of the coil. The pressure is released, the excess resin is drained off, and the coil is placed in an oven and heated until it is cured. Typically, this requires a temperature of about 100° C. to about 180° C. for about 2 to about 16 hours.

The following examples further illustrate this invention.

EXAMPLE 1

The following compositions were prepared (in parts by weight):

| | Composition | | | | | | | | |
|---|---|---|---|---|---|---|---|---|---|
| | A | B | C | D | E | F | G | H | I |
| Liquid polybutadiene having about 45% 1,2 unsaturation sold by Revertex as "Lithene AL" | — | — | — | — | — | — | — | 50 | — |
| Liquid polybutadiene having about 85% 1,2 unsaturation sold by Nippon Soda Co., Ltd. as "Hystl B-1000" | — | — | — | — | — | — | — | — | 50 |
| Liquid polybutadiene having 70% 1,2 unsaturation sold by Colorado Chemical Specialties Inc, under the trade designation "Ricon 150" | 50 | 40 | 40 | 50 | 50 | 50 | 50 | — | — |
| Dicyclopentadiene acrylate | 50 | — | — | 50 | 50 | 40 | 25 | 50 | 50 |
| Vinyl Toluene | — | 60 | 60 | — | — | 10 | 25 | — | — |
| 5% Solution of t-butyl hydroquinone in dibutylphthalate | 1 | 1 | 1 | 1.5 | 1 | 1 | 1 | 1 | 1 |
| Dicumyl, peroxide | 0.7 | — | — | — | — | 0.7 | — | 0.7 | 0.7 |
| Bis(t-butylcyclohexyl) peroxydicarbonate | 0.3 | — | 0.3 | — | — | — | — | 0.3 | 0.3 |
| α, α'-bis(t-butylperoxy) diisopropyl benzene | — | 1 | — | — | — | — | — | — | — |
| 2,5-dimthyl-2,5-bis (benzoylperoxy) hexane | — | 0.2 | — | — | — | — | — | — | — |
| 2,5-dimethyl-2,5-bis (t-butylperoxy) hexane | — | — | 0.7 | 0.7 | 0.7 | — | — | — | — |
| Vinyl-tris(betamethoxyethoxy) silane | — | — | — | — | — | 0.3 | 0.3 | — | — |

The gel time at 125° and 135° C. was measured by placing 10 gram samples of the resins in a 25 mm × 175 mm test tube which was then immersed in a controlled temperature silicon oil bath. The gel time was automatically stopped and the time in minutes was displayed by the use of a Sunshine Gel Meter with a glass rod attached.

In other tests, 10 gram samples of the compositions were cured in aluminum foil weighing dishes to give a sample 2.25 inches in diameter and about 0.125 inches deep. The dissipation factor (100×tangent Δ) and the dielectric constant ($\epsilon'$) were measured at room temperature and at 150° C. after the samples were equilibrated at temperature for a minimum of 1 hour. The measurements were made using General Radio Capacitance Bridge, Type 1611-B without sample ring guards. The following table presents the results of these tests.

| | Composition | | | | | | |
|---|---|---|---|---|---|---|---|
| Properties | A | B | C | D | E | F | G |
| Gel @ 125° C. (min) | 8 | 27 | 55 | 11 | 10 | — | — |
| Gel @ 135° C. (min) | 8 | 11 | 22 | — | — | 14 | 17 |
| % tan δ @ 25° C. | 0.2 | 0.1 | 0.05 | 0.2 | 0.1 | 0.5 | 0.3 |
| % tan δ @ 150° C. | 0.1 | 0.1 | 0.1 | 0.2 | 0.2 | 0.1 | 0.1 |
| $\epsilon'$ @ 25° C. | 2.3 | 2.2 | 2.0 | 2.6 | 2.6 | 2.7 | 2.5 |
| $\epsilon'$ @ 150° C. | 2.5 | 2.4 | 2.4 | 2.6 | 2.6 | 2.7 | 2.9 |

The viscosities of the uncured compositions were measured at room temperature (20°–25° C.) using a Gardner-Holt bubble method. The following table gives the results.

| Composition | Visc. (cps) |
|---|---|
| A | 600–800 |
| B | 15–45 |
| F | 200–400 |
| G | 85–140 |
| H | 250 |
| I | 165 |

EXAMPLE 2

A mica bond was made from polybutadiene resins having the following compositions:

| Materials | Adhesive | Mica Binder |
|---|---|---|
| "Ricon 150" | 50 | 100 |
| "Ricon 160"* | 50 | — |
| Dicyclopentadiene acrylate | 25 | — |
| Triallylcyanurate | 2.5 | 4 |
| Hexane | 20 | — |
| Toluene | 4.5 | 381 |
| 5% Solution of t-buty | 2.4 | 1.9 |

| Materials | Adhesive | Mica Binder |
|---|---|---|
| hydroquinone in dibutylphthalate | | |
| Methyl ethyl ketone | — | 362 |
| Visc. @ 25° C. | ~1300 cps | ~0.5 cps |
| (G.H. Bubble) | X | A-5 |

Liquid polybutadiene 80% solids in hexane having 90% 1, 2 unsaturation sold by Colorado Chemical Specialites, Inc.

To verify the compatability of the polybutadiene mica bond (30% adhesive + 70% binder) with various polybutadiene impregnants, the gel times and dielectric properties of neat resin samples were studied.

The samples were made by mixing 36% by weight of the mica bond, described above, with 64% by weight of the VPI resins from Example 1. 10 g of each of the mixtures was cured in an aluminum weighing dish with a watch glass cover. The cure cycle was 2 hours at 105° C. plus 4 hours at 135° C. plus 8 hours at 160° C.

The following table gives the results of the tests that were performed on the cured neat resin samples.

| Composition | Gel Min/115° C. | Room Temperature | | 100° C. | | 150° C. | |
|---|---|---|---|---|---|---|---|
| | | 100 × Tan δ | ε' | 100 × Tan δ | ε' | 100 × Tan δ | ε' |
| A | 12.3 | 0.2 | 0.10 | 0.10 | 2.75 | 0.10 | 2.75 |
| F | 14.9 | 0.2 | 0.11 | 0.05 | 2.56 | 0.10 | 2.35 |
| G | 12.5 | 0.2 | 0.11 | 0.05 | 2.34 | 0.10 | 2.34 |
| B | 26.1 | 0.1 | 0.12 | 0.05 | 2.11 | 0.10 | 2.11 |

EXAMPLE 3

Mica paper 0.005 inches thick and 45 inches wide was roll-coated with the mica binder described in Example 2 containing polybutadiene so as to produce about 4 or 5% by weight resin solids per unit weight of the mica paper. The solvent in the mica binder was evaporated and the adhesive described in Example 2 also containing polybutadiene was roll-coated on the mica paper to produce about 2 to about 5% by weight resin solids per unit weight of the paper. The solvent in the adhesive was evaporated and the resulting dry mica paper was wrapped around a ½ inch copper tube 5½ times.

The tubes were covered with a 0.010 inch glass tape to act as an armor coat to protect and insulate the mica from damage. The wrapped tubes were vacuum pressure impregnated by applying a vacuum of ≦5 Torr to the tubes. The VPI resin was introduced under vacuum and then a pressure of 80 psig was applied. The excess resin was drained from the tubes and the insulated tube was heat cured in a circulating air oven. A conductive paint was then applied over the glass tape and a copper foil was placed over that to make the electrode for the dielectric test.

The following VPI resin (composition J) according to this invention was prepared and used as described above:

| Component | Parts by Weight |
|---|---|
| "Ricon 150" | 50 |
| Dicyclopentadiene acrylate | 35 |
| Vinyl toluene | 15 |
| 5% solution of tertiary butylhydroquinone dissolved in dibutylphthalate | 1 |
| 2,5-dimethyl-2,5-bis (t-butylperoxy) hexane | 0.7 |
| Dicumyl peroxide | 0.6 |
| Vinyl-tris (betamethoxyethoxy) silane | 0.3 |

This composition was tested against two commercial compositions. The first was an anhydride cured epoxy resin sold by Westinghouse Electric Corporation as "53841WS," and the second was a vinyl toluene cross linked polybutadiene resin sold by Special Electric Company, Inc. as "Butex 365-5." Tubes were made and tested as hereinbefore described. The following table gives the results.

| | % Tan δ @ 175° C. | | | | | | | |
|---|---|---|---|---|---|---|---|---|
| | Initial | | 30d @ 190° C. | | 30d @ 210° C. | | 50d @ 210° C. | |
| VPI Resin | 1Kv | 4Kv | 1Kv | 4Kv | 1Kv | 4Kv | 1Kv | 4Kv |
| "53841WS" | 22.2 | 24.5 | 31.3 | 31.4 | 33.7 | 32.5 | 51.7 | 56.8 |
| "Butex 365-5" | 11.4 | 13.7 | 7.3 | 8.4 | 11.6 | 12.9 | 11.3 | 14.0 |
| J | 3.9 | 4.2 | 3.0 | 3.6 | 1.3 | 1.7 | 1.2 | 1.9 |

We claim:

1. An electrical article comprising a coil of insulated elongated conductors impregnated with a resin which comprises:
   (A) polybutadiene, at least about 15% of which is 1,2-polybutadiene;
   (B) about 10 to about 150 phr dicyclopentadiene acrylate;
   (C) about 0.005 to about 0.75 phr free radical polymerization inhibitor;
   (D) about 0.05 to about 2.5 phr free radical polymerization initiator; and
   (E) up to about 2.0 phr coupling agent.

2. An article according to claim 1 wherein said resin includes about 1 to about 80 phr of an aromatic monomer having 1 to 2 vinyl groups.

3. An article according to claim 2 wherein said aromatic monomer is vinyl toluene.

4. An article according to claim 1 wherein said insulated elongated conductors is a motor or generator winding.

5. An article according to claim 1 wherein said free radical polymerization inhibitor is tert-butyl hydroquinone.

6. An article according to claim 1 wherein said free radical polymerization initiator is dicumyl peroxide.

7. An article according to claim 1 wherein said coupling agent is a silane.

8. An article according to claim 7 wherein said silane is vinyl-tris (betamethoxyethoxy) silane.

9. An article according to claim 1 wherein said resin has been vacuum pressure impregnated into the interstices of said coil of insulated elongated conductors, and cured.

10. An article according to claim 1 wherein said elongated conductors are individually and collectively insulated.

11. An article according to claim 10 wherein said insulation comprises mica having a polybutadiene binder.

12. An article according to claim 11 wherein said polybutadiene binder comprises:
 (A) polybutadiene, at least about 15% of which is 1,2-polybutadiene;
 (B) about 10 to about 150 phr dicyclopentadiene acrylate;
 (C) about 0.005 to about 0.75 phr free radical polymerization inhibitor;
 (D) about 0.05 to about 2.5 phr free radical polymerization initiator; and
 (E) up to about 2.0 phr coupling agent.

13. An electrical article comprising a coil of insulated elongated conductors impregnated with a composition comprising:
 (A) polybutadiene, at least about 15% of which is 1,2-polybutadiene,
 (B) about 10 to about 150 phr dicyclopentadiene acrylate;
 (C) about 0.005 to about 0.75 phr free radical polymerization inhibitor;
 (D) about 0.05 to about 2.5 phr free radical polymerization initiator; and
 (E) up to about 2.0 phr coupling agent.

* * * * *